United States Patent [19]

Heinemann

[11] Patent Number: 4,545,704
[45] Date of Patent: Oct. 8, 1985

[54] METHOD AND APPARATUS FOR THE PNEUMATIC CONVEYANCE OF FINE MATERIAL

[75] Inventor: Otto Heinemann, Ennigerloh, Fed. Rep. of Germany

[73] Assignee: Krupp Polysius AG, Beckum, Fed. Rep. of Germany

[21] Appl. No.: 574,996

[22] Filed: Jan. 30, 1984

[30] Foreign Application Priority Data

Mar. 15, 1983 [DE] Fed. Rep. of Germany ....... 3309210

[51] Int. Cl.⁴ ...................... B65G 53/36; B65G 53/40
[52] U.S. Cl. ...................... 406/32; 406/123; 406/143
[58] Field of Search ............ 406/142, 143, 10, 14, 406/24, 25, 30, 32, 123

[56] References Cited

U.S. PATENT DOCUMENTS

| | | | |
|---|---|---|---|
| 3,964,793 | 6/1976 | Volpeliere | 406/142 X |
| 4,029,365 | 6/1977 | Ahrens et al. | 406/138 X |
| 4,279,549 | 7/1981 | Hanrot et al. | 406/14 |

FOREIGN PATENT DOCUMENTS 2415592  9/1979  France ............................... 406/143

Primary Examiner—Jeffrey V. Nase
Attorney, Agent, or Firm—Learman & McCulloch

[57] ABSTRACT

A method and apparatus for the pneumatic conveyance of fine material using a conveyor vessel and a storage chamber in which the discharge capacity of the vessel is increased by delivering material from the storage chamber to the conveyor vessel and reduced by delivering material from the conveyor vessel to the storage chamber. Such method and apparatus are distinguished by the capability of altering the capacity without delay, keeping the set conveying capacity constant, and simple calibration.

15 Claims, 6 Drawing Figures

METHOD AND APPARATUS FOR THE PNEUMATIC CONVEYANCE OF FINE MATERIAL

BACKGROUND OF THE DISCLOSURE

The invention relates to a method and apparatus for the pneumatic conveyance of fine material.

A method of the general type to which the invention relates is disclosed in German Auslegeschrift No. 24 61 579. When the aerating or nozzle air is regulated so as to be constant in quantity the pneumatic aerating pressure in the conveyor vessel or the pressure prevailing at the conveyor nozzle corresponds to the filling level of the conveyor vessel (i.e., the column of material resting on the aerating base). As is explained in detail in the German Auslegeschrift, each value of the pneumatic aerating pressure corresponds to a specific discharge capacity of the conveyor vessel. Therefore, if the aerating pressure or the filling level in the conveyor vessel is altered the conveying capacity can be set.

In order to alter the discharge capacity of the conveyor vessel from a minimum value to a maximum value in the known method it is necessary to raise the filling level the conveyor vessel quite considerably. Such an increase in the discharge capacity can only be achieved with a certain delay in response, particularly because of the limited capacity of the feed apparatus (by means of which the material is delivered to the conveyor vessel in order to raise the filling level). The same applies when the discharge capacity of the conveyor vessel is to be reduced from a high value to a low value because the reduction in the conveying capacity of the conveyor vessel depends upon how quickly the filling level in the conveyor vessel and with it the discharge capacity is reduced.

There are cases (for instance the controlled supply of fuel such as coal dust to a burner) in which desired alterations in the discharge capacity of the conveyor vessel must take place particularly quickly.

An object of the invention is to develop further the method referred to so that alterations in the conveying capacity take place particularly quickly, i.e., with a very short delay in response. In addition, the method according to the invention should make it possible to keep the set conveying capacity constant with particular accuracy, even when the material supply to the conveyor vessel takes place by means of a simple on/off switch or fluctuates greatly for other reasons. It also is an object of the invention to provide a conveying method in which apparatus for performing the method can be calibrated particularly accurately and without the aid of a special calibration vessel.

SUMMARY OF THE INVENTION

In a pneumatic conveyor system according to the invention the conveying capacity may be increased as desired by connecting a storage chamber to the conveyor vessel and transferring material from the storage chamber to the conveyor vessel. In this way it is possible quite rapidly to increase the filling level in the conveyor vessel, the aerating pressure and thus the discharge capacity. In a corresponding manner, with a desired reduction in the conveying capacity, material can be transferred very quickly from the conveyor vessel to the storage chamber, as a result of which the filling level and the aerating pressure in the conveyor vessel fall and, consequently, the discharge capacity is reduced. Since the movements of material between the storage chamber and the conveyor vessel take place without significant time-lag, very rapid alterations of the conveying capacity upwards or downwards are possible.

It is a further significant advantage of the method according to the invention that a set conveying capacity can be kept very accurately constant since the slightest fluctuations in the filling level in the conveyor vessel are immediately equalized by corresponding movements of material out of or into the storage chamber. The control is independent of fluctuations in the material supply to the conveyor vessel. The material supply can therefore be achieved in a particularly simple manner, for example by a simple on/off switch.

The method according to the invention is distinguished by particularly simple and accurate calibration of conveying apparatus operating according to the method.

According to an advantageous embodiment of the method according to the invention the material in the storage chamber is under a regulable pressure, and the movement of material between the storage chamber and the conveyor vessel is controlled by influencing the pressure exerted on the material in the storage chamber. Pneumatic pressure is preferably used. However, within the scope of the invention it is also possible to subject the material in the storage chamber to hydraulic pressure by means of a roller diaphragm or by means of a suitable cylinder-piston system.

In order to maintain the filling level in the conveyor vessel (and with it the set conveying capacity) constant, the pneumatic base pressure is advantageously monitored and when the base pressure deviates from the predetermined theoretical value the pressure exerted on the material in the storage chamber is altered (which results in a corresponding movement of material between the storage chamber and the conveyor vessel). Since the pneumatic base pressure and the pressure prevailing at the conveyor nozzle are approximately equal and are roughly proportional to the filling level in the conveyor vessel when the aerating air or nozzle air is regulated to keep the quantity constant, the pressure prevailing at the conveyor nozzle can also be used within the scope of the invention instead of the pneumatic base pressure in order to keep the filling level in the conveyor vessel constant.

THE DRAWINGS

Further features of the invention are explained in greater detail in the following description and are illustrated in the accompanying drawings, wherein:

FIG. 1 is a schematic representation of apparatus according to one embodiment and operating in accordance with the invention; and FIGS. 2–6 are schematic representations of further embodiments.

DETAILED DESCRIPTION

Figure 1:
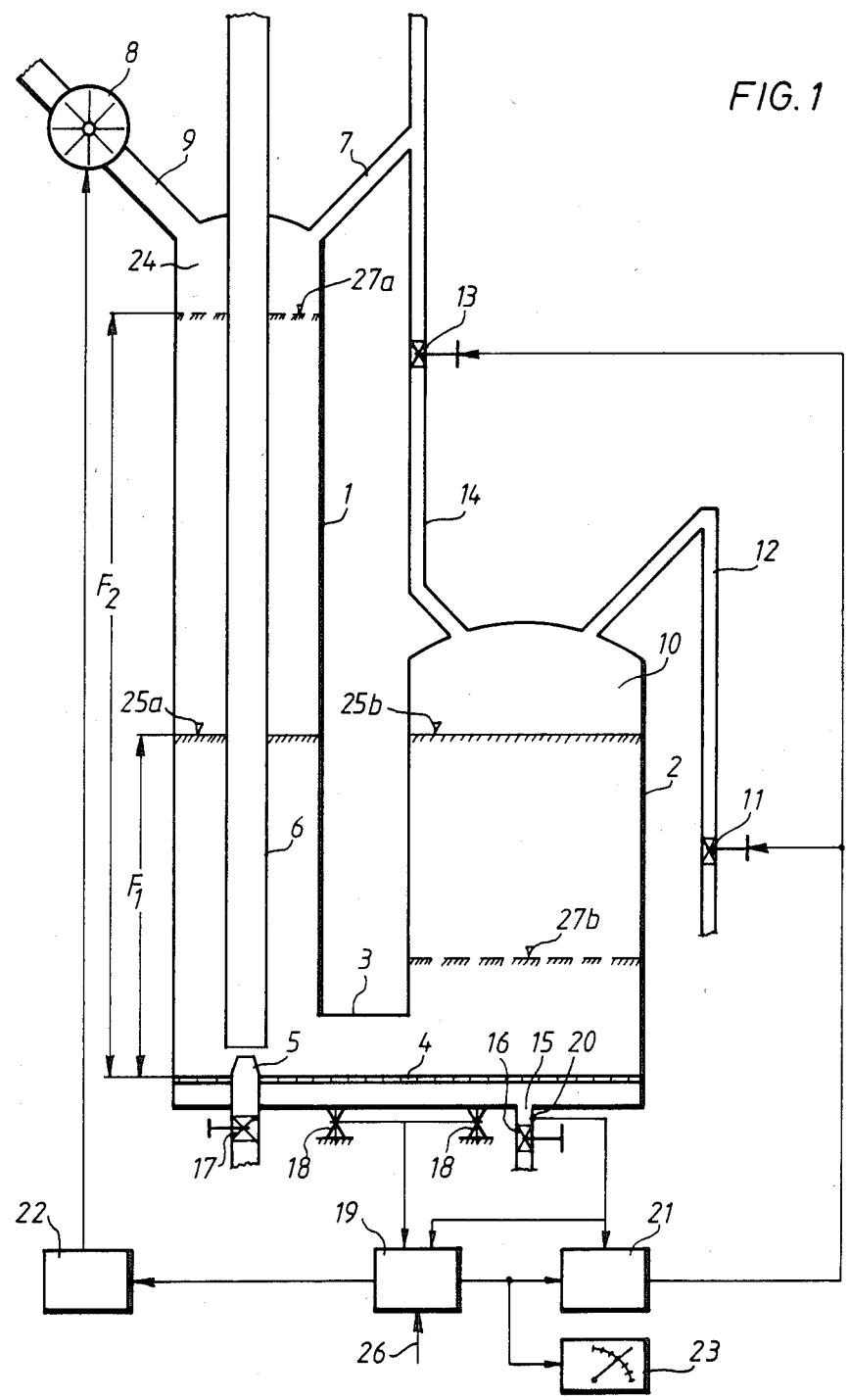

The apparatus according to FIG. 1 contains a conveyor vessel 1 and a storage chamber 2 which are connected to each other like communicating pipes by a connecting part 3. The conveyor vessel 1 and the storage chamber 2 are arranged with their bases at the same height and are provided with a common pneumatic aerating base 4.

A conveyor nozzle 5 is arranged in the base region of the conveyor vessel and above it is located the inlet of a pneumatic feed pipe 6 which passes through the conveyor vessel 1 in a vertical direction.

An air vent connection 7 and a material supply connection 9 provided with a bucket-wheel charging valve 8 are provided in the upper region of the conveyor vessel 1.

The storage chamber 2 is greater in cross-section and lower in height than the conveyor vessel 1. The air-filled upper region 10 of the storage chamber 2 is connected to an air supply connection 12 regulated by a valve 11 and to an air extraction connection 14 regulated by a valve 13.

The air connection to the aerating base 4 is designated by 15. A constant quantity regulating valve 16 is arranged in this air connection 15. A further such valve 17 is arranged in front of the conveyor nozzle 5.

The system formed by the conveyor vessel 1 and the storage chamber 2 is supported on pressure cells 18. The signal from the pressure cells 18 corresponding to the weight of the conveyor vessel 1, the storage chamber 2, and the material contained therein is fed to a computer 19. A pressure cell 20 supplies a signal corresponding to the pneumatic aerating pressure (the so-called base pressure) to the computer 19 and a regulator 21 which acts on the valves 11 and 13. The apparatus also includes a further regulator 22 and a display arrangement 23.

In operation the apparatus according to FIG. 1 functions as follows:

If there is atmospheric pressure in the upper region 10 of the storage chamber 2 (as there always is above the air vent connection 7 in the upper region 24 of the conveyor vessel 1), then the material in the conveyor vessel 1 and in the storage chamber 2 reaches the same filling level (filling level 25a and 25b). The pneumatic aerating pressure (air connection 15) or the approximately equal pneumatic pressure at the conveying nozzle 5 corresponds to a predetermined filling level $F_1$ providing a set conveying capacity $Q_1$. As much material is then delivered via the material supply connection 9 to the conveyor vessel 1 as is discharged via the conveyor pipe 6. However, irrespective of fluctuations in the material supply (via the material supply connection 9) the filling level $F_1$ and with it the set conveying capacity $Q_1$ are kept constant in such a way that in the event of any lowering of the filling level $F_1$ a quantity of material is transferred from the storage chamber 2 to the conveyor vessel 1 such that the original filling level $F_1$ is restored. The set filling level in the conveyor vessel 1 is kept constant by monitoring the aerating pressure by means of the pressure cell 20. If the actual value determined here deviates from the theoretical value supplied to the computer 19 (at 26) and the regulator 21, then the regulator 21 supplies a corresponding signal to the valves 11 and 13. If the filling level in the conveyor vessel 1 falls below the set value and the aerating pressure is consequently reduced, then the valve 11 opens and the valve 13 closes. As a result the pressure is increased in the upper region 10 of the storage chamber 2 and sufficient material is forced out of the storage chamber 2 into the conveyor vessel 1 until the original filling level $F_1$ is restored. On the other hand, if the filling level rises above the predetermined value $F_1$ and as a result the aerating pressure is increased above the theoretical value, then the regulator 21 opens the valve 13 and closes the valve 11. In this way the pressure in the upper region 10 of the storage chamber 2 is reduced and material flows out of the conveyor vessel 1 into the storage chamber 2.

If the discharge capacity of the conveyor vessel 1 is to be increased rapidly from the value $Q_1$ to a value $Q_2$ then the filling level in the conveyor vessel 1 must be raised to the value $F_2$. For this purpose the computer 19 is provided with a correspondingly higher theoretical value for the conveying capacity (at 26). The comparison made by the regulator 21 between the actual value and the theoretical value for the aerating pressure leads the regulator 21 to open the valve 11 and close the valve 13 and build up pressure in the upper region 10 of the storage chamber 2 such that a filling level 27b is set in the storage chamber 2 and a filling level 27a is correspondingly set in the conveyor vessel 1. If a higher discharge capacity is required, material is promptly forced out of the storage chamber 2 into the conveyor vessel 1 and there the filling level is correspondingly raised. If on the other hand it is desired to reduce the discharge capacity of the conveyor vessel 1 by reducing the pressure in the storage chamber 2 (opening the valve 13) material is quite quickly transferred from the conveyor vessel 1 to the storage chamber 2.

Setting the conveying capacity, keeping it constant and altering it are thus practically independent of the characteristics of the material supply to the conveyor vessel 1 via the material supply connection 9. The necessary later supply of material via the bucket-wheel charging valve 8 can therefore be achieved for example by a simple on/off switch. In the embodiment shown in FIG. 1 the signal supplied by the pressure cells 18 is fed via the computer 19 to the regulator 22 which controls the bucket-wheel charging valve 8 in such a way that the total quantity of material contained in the conveyor vessel and in the storage chamber 2 is in each case approximately constant. The conveying capacity set in each case can be read off on the display apparatus 23 which receives a signal corresponding to the theoretical value for the aerating pressure.

The conveyor vessel 1, the storage chamber 2 and the quantity of material contained therein are advantageously of such dimensions that when the filling level in the conveyor vessel 1 is at maximum there is a minimum filling level in the storage chamber 2. In this way the total capacity of the storage chamber 2 is available for rapid alterations in the conveying capacity (upwards or downwards).

The apparatus according to FIG. 1 is calibrated according to a preferred method as follows:

With the material supply connection 9 closed a specific filling level is set in the conveyor vessel 1 and kept constant in the manner described by means of the pressure in the storage chamber 2 (since with the material supply connection closed the material discharged from the conveyor vessel 1 is delivered by the storage chamber 2, the pressure in the storage chamber 2 must be reset during this conveying interval). The pneumatic aerating pressure thus set (which, like the filling level in the conveyor vessel 1, is constant) is measured. At the same time the reduction in weight of the whole system within this interval is determined (this reduction in weight corresponds to the material discharged in this interval of time). From this the conveying capacity is calculated (quantity of material discharged per unit of time). In this way the first point of the desired function (conveying capacity as a function of the pneumatic aerating pressure) is obtained.

Then the same process is repeated, setting another filling level in the conveyor vessel (and thus another conveying capacity). By repeating this measurement a number of times any number of points of the desired calibration function can be obtained. These are fed into the computer and thus in operation a desired conveying capacity can be set by predetermining a corresponding pneumatic aerating pressure (base pressure).

Figure 2:
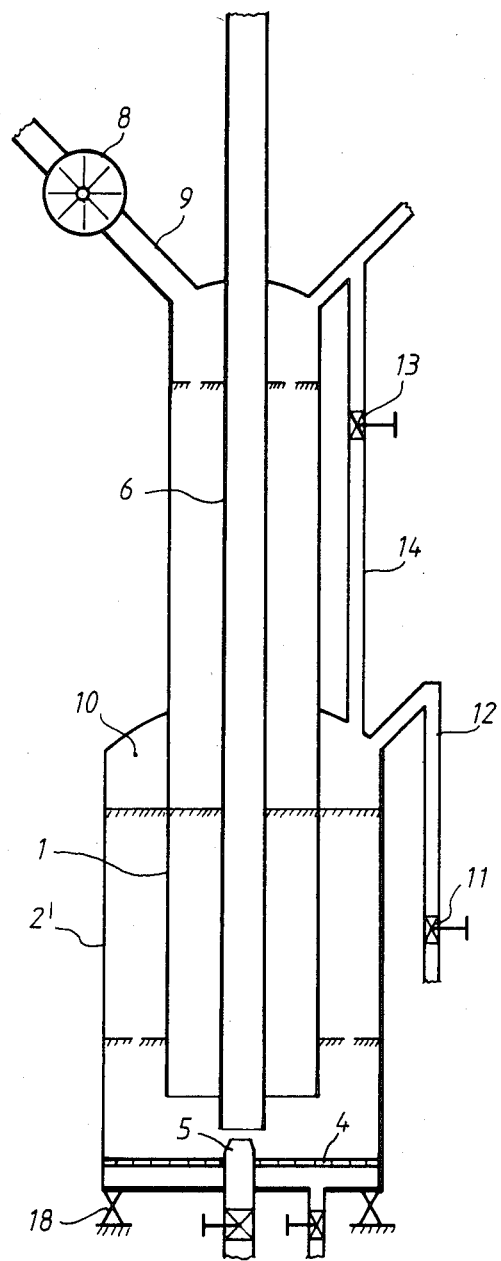

Whereas in the embodiment shown in FIG. 1 the conveyor vessel 1 and the storage chamber 2 are arranged adjacent to one another, FIG. 2 shows a variant in which the storage chamber 2' is of annular construction and is arranged coaxially with the conveyor vessel 1. Otherwise the same reference numerals are used in FIG. 2 as in FIG. 1 for the same components, so a detailed description is unnecessary. For the sake of simplicity the computer, regulator and the control lines have been omitted in FIG. 2. The variant according to FIG. 2 is distinguished by a particularly compact construction in which the transfer of material from the storage chamber 2' to the conveyor vessel 1 and vice versa takes place particularly smoothly, with little friction and no delay as a result of the coaxial arrangement.

Figure 3:
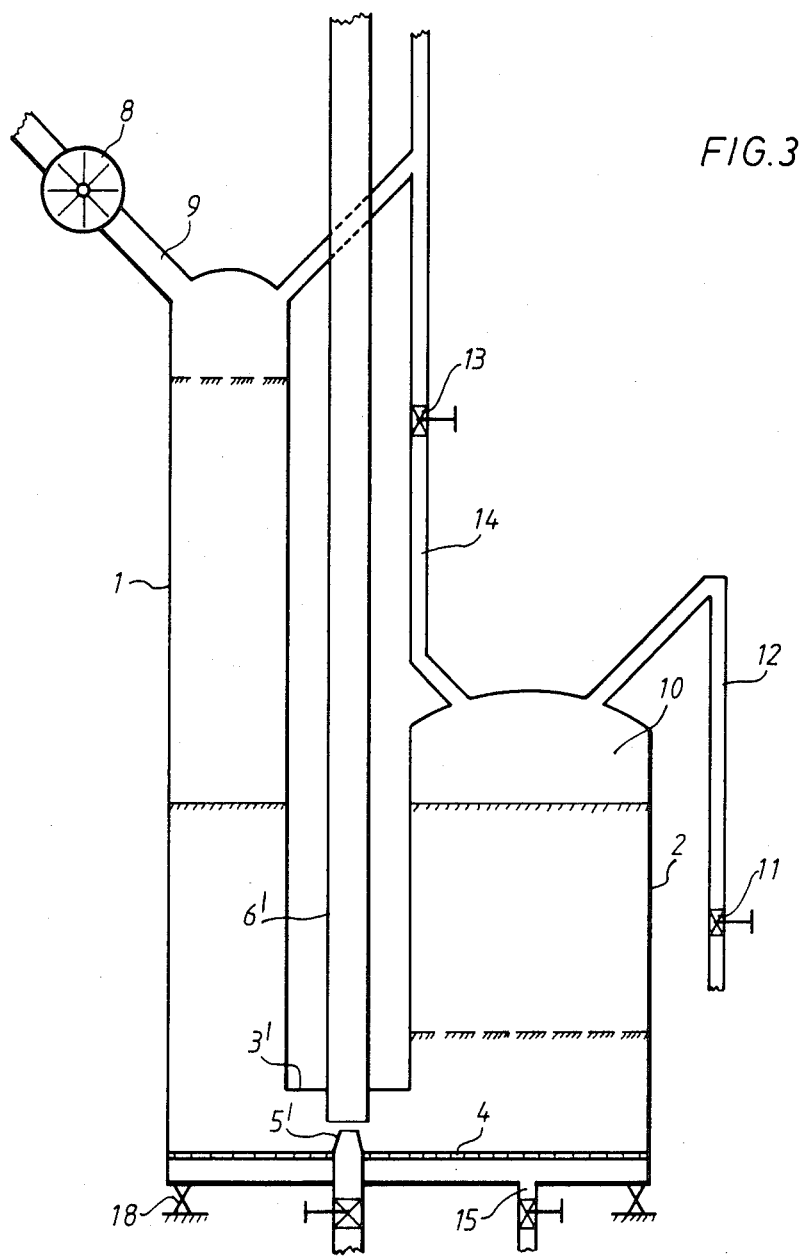

FIG. 3 shows an embodiment in which—as a variant of the embodiment according to FIG. 1—the conveyor nozzle 5' and the conveyor pipe 6' are connected to the connecting part 3' between the conveyor vessel 1 and the storage chamber 2. In this embodiment the conveyor pipe 6' can if desired be extended in a direction other than vertical, for instance just above the conveyor nozzle 5' it can be bent by any angle out of the plane of the drawing. Otherwise the embodiment according to FIG. 3 corresponds to that of FIG. 1.

Figure 4:
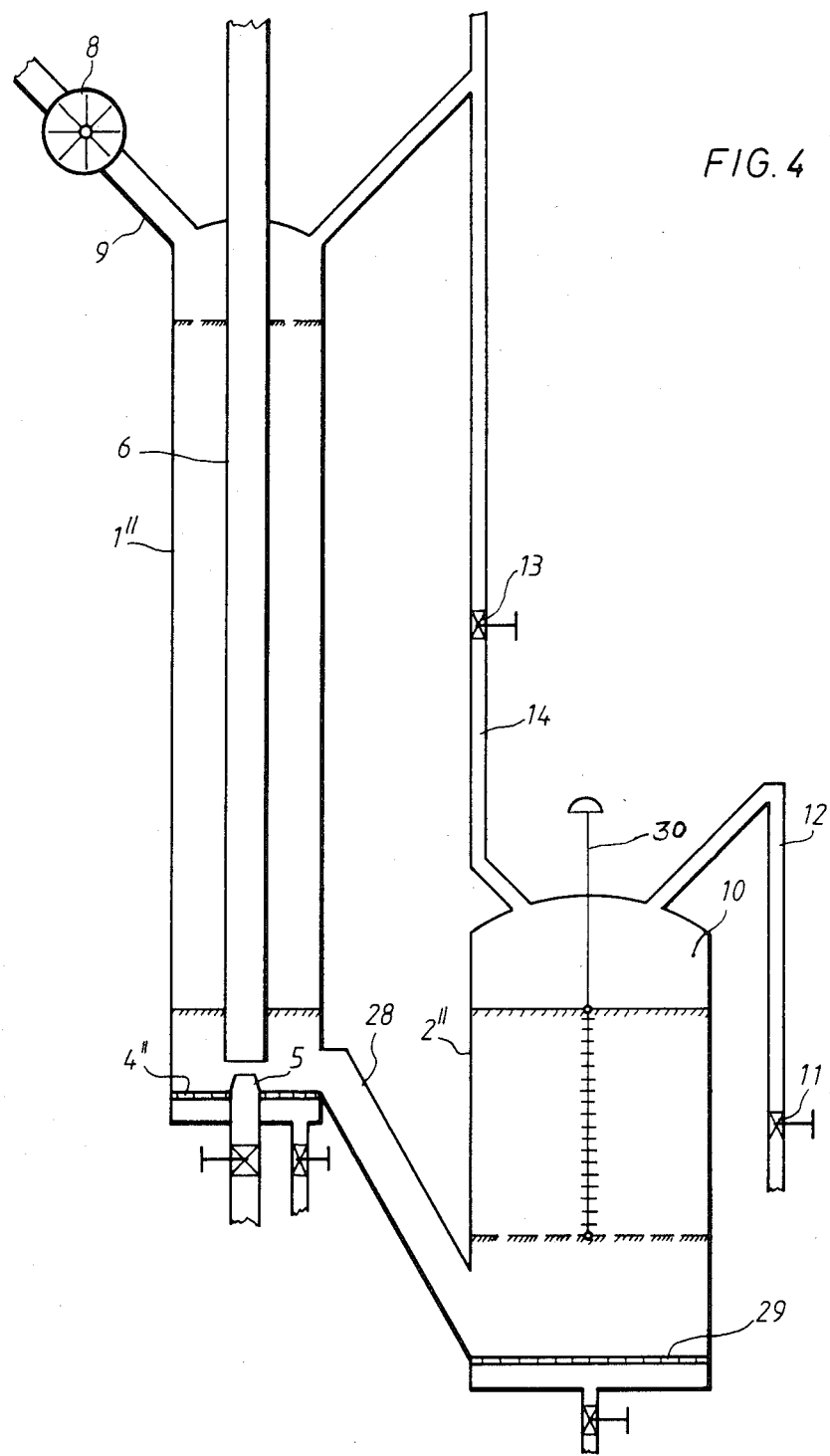

In the variant illustrated in FIG. 4 the storage chamber 2" is arranged lower than the conveyor vessel 1" and is connected to the latter by an inclined material pipe 28. The conveyor vessel 1" and the storage chamber 2" in this embodiment are provided with separate aerating bases 4" and 29 respectively.

As a further variation of the embodiments previously described, in the construction according to FIG. 4 the storage chamber 2" is also provided with a filling level measuring arrangement 30 which (instead of the pressure cells provided in the preceding embodiments) supplies the signal for the delivery of material to the conveyor vessel 1" via the material supply connection 9 and the bucket-wheel charging valve 8, for example when gravimetric calibration of the conveying capacity is not required.

Figure 5:
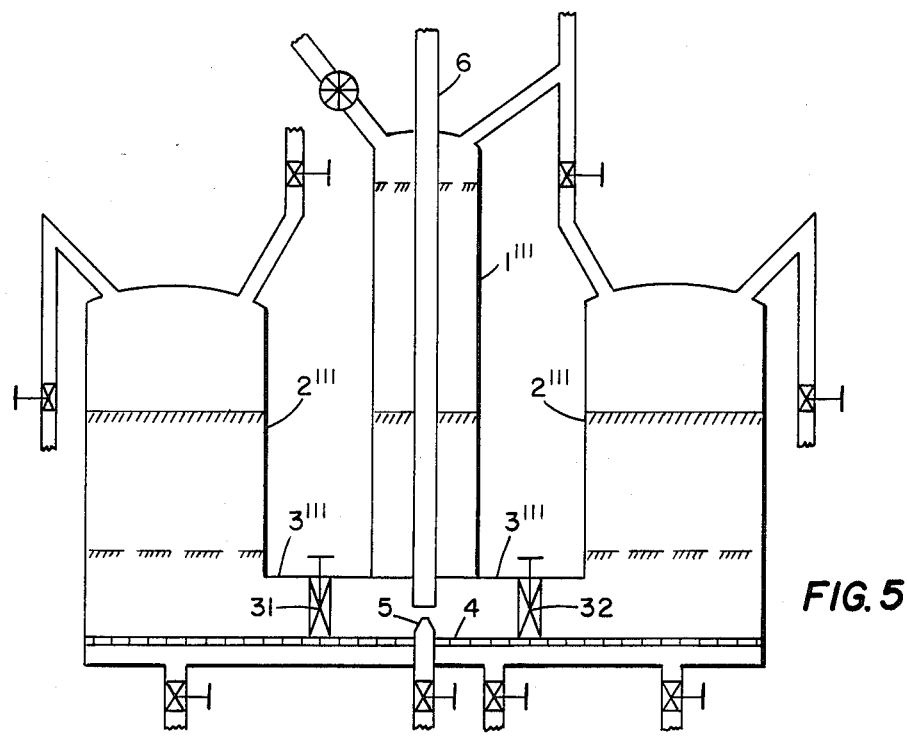

In the variant shown in FIG. 5 two storage chambers 2''' are connected with a single conveyor vessel 1''' by means of a pair of connecting parts 3'''. Valve means 31 and 32 in the connecting parts enable either or both of the storage chambers 2''' to communicate with the conveyor vessel.

Figure 6:
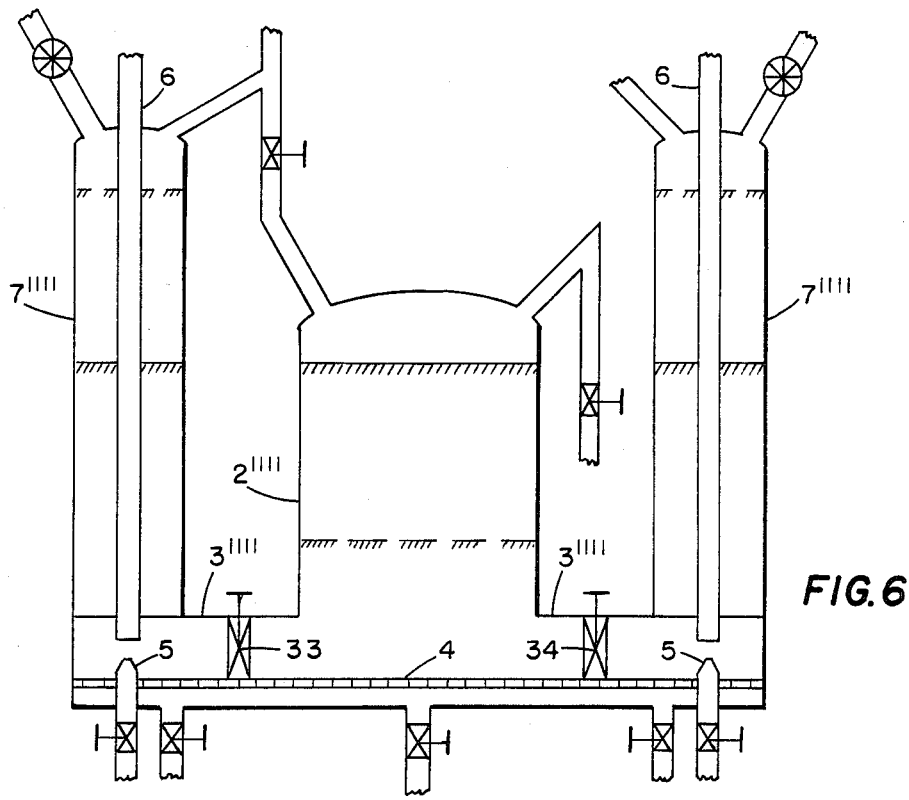

FIG. 6 shows a further variant where a pair of storage vessels 1'''' are connected to a single storage chamber 2'''' by connecting parts 3''''. In the connecting parts are valves 33 and 34 which enable the storage chamber to communicate with either or both of the storage chambers.

What is claimed is:

1. In a method of pneumatically conveying fine material from a conveyor vessel having a pneumatic aerating base at its lower end, an air vent and a material supply in its upper end, a conveyor nozzle adjacent said base and a pneumatic feed pipe having its inlet communicating with the conveyor nozzle, and wherein the pneumatic aerating pressure in the conveyor vessel or the pressure of the conveyor nozzle when the quantity of aerating air or nozzle air is kept constant corresponds to the filling level of the conveyor vessel and determines the discharge capacity of the conveyor vessel, the improvement comprising establishing communication between said conveyor vessel and a storage chamber and varying the discharge capacity of said conveyor vessel by transferring material between the storage chamber and said conveyor vessel.

2. The method according to claim 1 including maintaining material in the storage chamber under a regulable fluid pressure and controlling the movement of material between the storage chamber and the conveyor vessel by varying the pressure exerted on material in the storage chamber.

3. The method according to claim 2 including monitoring the pneumatic aerating pressure and altering the pressure exerted on material in the storage chamber when said aerating pressure deviates from a predetermined theoretical value.

4. The method according to claim 1 wherein the conveyor vessel, the storage chamber, and the quantity of material contained therein are of such dimensions that when the filling level in the conveyor vessel is at maximum there is a minimum filling level in the storage chamber and vice versa.

5. The method according to claim 1 including supplying material to the conveyor vessel and the storage chamber via the material supply connection, monitoring the weight of material in the vessel and chamber, and varying the supply of material to said chamber as a function of the filling level thereof.

6. The method according to claim 1 including calibrating the apparatus for a selected filling level by discontinuing the material supply to the conveyor vessel via the material supply, maintaining the selected filling level constant by means of the pressure in the storage chamber, measuring the pneumatic aerating pressure, and determining the reduction in weight of material within a specific period of time.

7. In apparatus for pneumatically conveying fine material comprising a conveyor vessel having an aerated base, means for supplying said vessel with material, a pneumatic conveyor pipe in communication with said vessel for conveying material outwardly therefrom, a conveyor nozzle communicating with said conveyor pipe, and means for supplying said base and said nozzle with compressed air, the improvement comprising a material storage chamber in communication with said vessel, said chamber having an aerated base; means for establishing a pressure on material in said chamber; and means for varying the pressure on material in said chamber to enable material from said chamber to flow into said vessel and vice versa.

8. Apparatus according to claim 7 wherein said vessel and said storage chamber are adjacent to one another and the storage chamber has a cross-sectional area greater than part of said vessel.

9. Apparatus according to claim 8 wherein said storage chamber has a height less than that of said vessel.

10. Apparatus according to claim 7 wherein said storage chamber is annular and surrounds the conveyor vessel coaxially.

11. Apparatus according to claim 7 wherein the bases of said conveyor vessel and said storage chamber are at the same height.

12. Apparatus according to claim 7 wherein the base of said storage chamber is at a level lower than that of the conveyor vessel and communicates with the latter via an inclined material pipe.

13. Apparatus according to claim 7 wherein the conveyor nozzle and the conveyor pipe communicate with one another between the conveyor vessel and the storage chamber.

14. Apparatus according to claim 7 including a plurality of said storage chambers communicating with said one conveyor vessel and means for establishing communication between said vessel and a selected number of said chambers.

15. Apparatus according to claim 7 including a plurality of conveyor vessels communicating with said storage chamber means for establishing communication between said chamber and a selected number of said vessels.

* * * * *